(No Model.) 2 Sheets—Sheet 1.
L. PAGET.
STORAGE BATTERY.
No. 393,573. Patented Nov. 27, 1888.
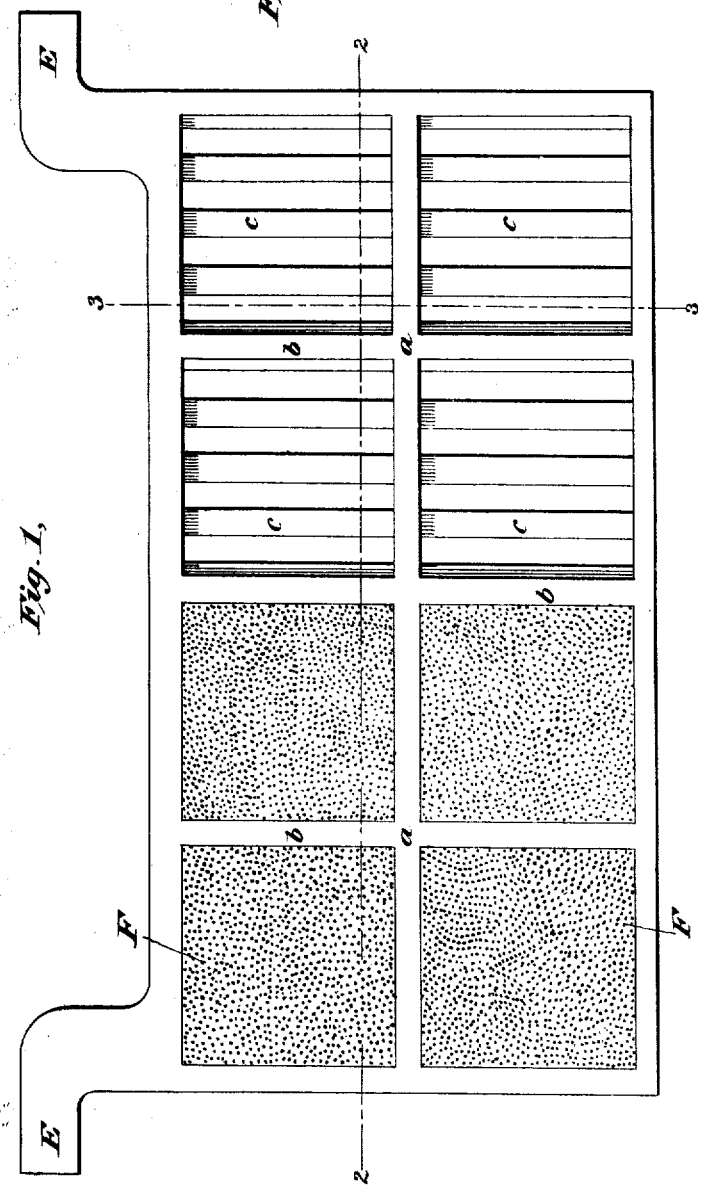
Witnesses.
C. J. Kintner,
J. F. Quinn.
Inventor,
Leonard Paget,
By his Attorneys,
Wiedersheim & Kintner.

(No Model.) 2 Sheets—Sheet 2.
L. PAGET.
STORAGE BATTERY.
No. 393,573. Patented Nov. 27, 1888.
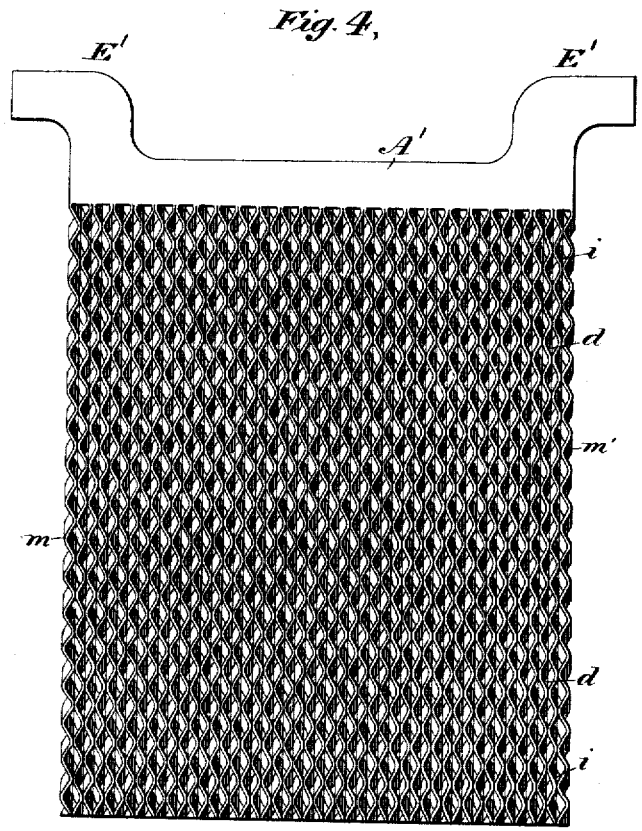
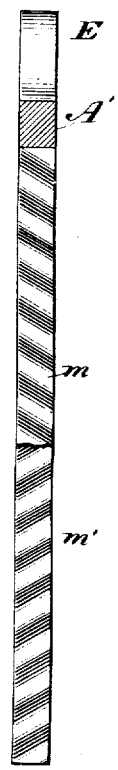
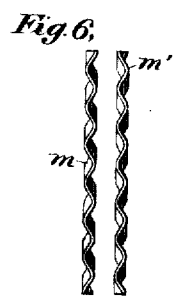

UNITED STATES PATENT OFFICE.

LEONARD PAGET, OF TRENTON, NEW JERSEY, ASSIGNOR TO THE MACRAEON STORAGE BATTERY COMPANY, OF NEW YORK, N. Y.

STORAGE-BATTERY.

SPECIFICATION forming part of Letters Patent No. 393,573, dated November 27, 1888.

Application filed May 8, 1888. Serial No. 273,165. (No model.)

*To all whom it may concern:*

Be it known that I, LEONARD PAGET, a citizen of the United States, residing at Trenton, in the county of Mercer and State of New Jersey, have invented a new and useful Improvement in Electric Storage-Batteries, of which the following is a specification.

My invention relates to improvements in storage-batteries in which the active material is applied to one of the electrodes, while the other electrode is of what is known as the "Planté" type.

The objects of my invention are, first, to obtain a porous positive electrode affording ready exit for the gases developed thereon and an even circulation of the electrolyte through it; second, to construct a negative electrode in such manner that the supporting-frame shall present a minimum amount of absorbent surface, and that the greater portion of the support for the active material shall not be directly exposed to the electrolyte, thereby preventing the development of hydrogen on the surface of the frame, instead of the reduced lead, and avoiding the development of false electro-motive force attained at the surface of the electrode or plate during the process of charging. It is the further object of this form of support to more securely hold the active material.

An additional object of my invention is an improved electrolyte which gives much more rapid formation of the positive plate or electrode than is possible with a plain lead electrode suspended in an electrolyte of dilute sulphuric acid.

It is the further object of my invention to increase the capacity and rates of charge and discharge of the battery, as well as to make it more durable.

I accomplish these objects by the apparatus and means hereinafter described, but particularly pointed out in the claims which follow this specification. At the outset I desire it to be understood that by the term "negative electrode or plate" I mean that electrode or plate which is to be reduced by the charging current, commonly and erroneously known as the "positive plate," and by the term "positive electrode or plate" I mean the lead plate which it is desired to peroxidize, commonly and erroneously known as the "negative plate."

My invention will be better understood by reference to the accompanying drawings, in which—

Figure 1 is a side elevation of my improved negative plate, showing the active material in position in the left side thereof, and the retaining grids or bars for holding such active material in the right-hand side thereof, the active material being removed, so as to show them. Fig. 2 is a horizontal cross-section on line 2 2, Fig. 1. Fig. 3 is a vertical cross-section on line 3 3, Fig. 1. Fig. 4 is a similar side elevation of the positive or lead plate. Fig. 5 is an end elevation of said lead plate, showing one of the suspended strips broken away at the bottom; and Fig. 6 is a detail view showing a part of the strips separated from each other in such manner as to disclose their internal or surface portions.

I will first describe the negative pole-plate or electrode shown in Fig. 1. I cast the retaining-plate A, of pure lead, in the shape of a frame having the usual contact lugs or ears, E E, and cross bars $a\, a\, b\, b$, which divide the frame into sections for holding the active material, while an additional set of cross-bars, $c\, c$, are at the same time cast with the frame, but at a lower or depressed level than the first-named cross-bars $a\, a\, b\, b$. The active material F, of the usual type, is pressed into the rectangular spaces on both sides of the plate, as clearly shown on the left-hand side of Figs. 1 and 2, in such manner as to entirely fill said spaces. It will be seen that by this arrangement all of the sustaining-bars $c$ are entirely embedded in the active material, the only portion of the frame exposed to the electrolyte being the ribs $a\, b$ and the end and bottom ribs, and even this surface may be reduced to a minimum by making the ribs $a\, a$ and $b\, b$ V-shaped, as will be understood.

I have found by experiment that with electrodes or plates in which portions of the supporting-frame are largely exposed with the active material there results local action, as well as deleterious effects, due to buckling, by virtue of the expansion and contraction of such exposed parts, and my improvement avoids these difficulties by presenting a minimum surface of such parts. The ribs $a\,b$ may be covered by wooden, vulcanite, or glass strips, as is usual in storage-batteries where it is desired to separate the positive and negative electrodes. While I define this type of electrode as being of negative form, and prefer to use it with the hereinafter-described positive electrode of the Planté type, I do not desire to be limited to its use as a negative electrode *per se*, as it is obvious I might use two such electrodes—one as the positive and the other as the negative.

The positive electrode (shown in elevation in Fig. 4) is composed of corrugated lead strips $m\,m'$, set, as shown, in a suspensory beam of type-metal, A', having ears or lugs E' E'. These strips are preferably attached to this suspensory beam by being cast into it, and rest one against another, the corrugation of each alternate strip producing grooves which run in one direction, while those of the succeeding alternate strips produce grooves which run in the opposite direction, the strips being placed back to back, as clearly shown in Fig. 4, the first set of openings, $i$, passing from the front of the plate to the rear, and the second set, $d$, passing from the rear to the front, the two sets being inclined to each other at an angle. The suspensory beam A' constitutes the sole support of these lead strips, they being entirely free at their lower ends, but always in contact with each other.

It will be understood upon examining the construction shown in Figs. 4, 5, and 6 that the electrolyte has a positive circulation in both directions through the electrode, and that a maximum surface is obtained with a minimum amount of material, while the corrugated strips are so related to each other as to make a comparatively solid and firm electrode. I have found by experiment that during the process of charging and discharging an electrode of this nature there is an expansion and contraction of about ten per cent. of the normal length of one of the strips. Were both ends of these strips rigidly fastened, or were they allowed to dangle freely and independent of each other, serious results would follow. I construct these corrugated strips in such manner that the corrugations thereof must be equal in width or length to the width of the strip, and they are located at such an angle as to connect the diagonal points of the rhomboid which is formed by them. I find that a plate or electrode constructed after this manner presents such an enlarged surface that it is rendered much more porous and allows much freer passage for the gases and for the interchange of the electrolyte than with any of the known forms with which I am acquainted.

I am aware that it is old to utilize two electrodes of this general corrugated type in a storage-battery, the one being positive and the other negative, and I make no claim to such feature, broadly, one branch of my invention being directed to the combination of this type of electrode with the negative electrode above described.

I will now describe the electrolyte, which is designed especially for the purpose of reducing the positive plate in the quickest possible time. It is composed of dilute sulphuric acid of the proportions of one to five with ten per cent. of nitrite of ethyl or acetate of ethyl, the nitrite being more active if acidified with not more than one per cent. nitric acid, the acetate also with not more than two per cent. of acetic acid. I find that if these proportions are exceeded the plate will be dissolved. I immerse the two plates or electrodes in this electrolyte and pass through them a current of electricity sufficiently powerful to cause a commotion of the solution, it being electrolyzed with a current of from six to ten ampères per square foot of actual positive pole-plate or electrode-surface. There results from this action an exceedingly rapid peroxidation of the positive pole-plate or electrode in the nature of a coherent hard-deposit. I find that an electrode can be peroxidized in this electrolyte in a very brief space of time, whereas with the Planté method and electrolyte of dilute sulphuric acid days and even weeks are required. With my improvement only one charge is required of one and one-half times to twice the ultimate capacity of the plates. The plates are then removed, washed with water, and set up in the usual electrolyte.

Having thus described my invention, what I claim, and desire to secure by Letters Patent of the United States, is—

1. A negative electrode for a secondary or storage battery, consisting of a sustaining frame or plate having the active material held in place in its depressed faces by parts of the frame wholly beneath it, substantially as described.

2. A negative electrode for a secondary or storage battery, consisting of a plate or frame having the active material packed in sections thereof and wholly embedding the parts which sustain or support it, substantially as described.

3. A negative electrode for a secondary or storage battery, consisting of a frame having depressed spaces filled with active material, and rigid sustaining-bars wholly buried beneath said active material, substantially as described.

4. A negative electrode for secondary or storage batteries, consisting of a conducting-frame having two or more cross-ribs dividing it into sections, and a series of depressed cross-bars lying below the level of said ribs for holding the active material in place, substantially as described.

5. The combination, in a secondary battery, of a positive electrode having corrugated oxidizable strips with a negative electrode, consisting of a frame composed of stiffening cross-bars and depressed sustaining-bars located wholly beneath the surface of the active material, substantially as described.

6. An electrolyte for secondary or storage batteries, consisting of dilute sulphuric acid, in combination with nitrite of ethyl or its described equivalent, in substantially the proportions enumerated, substantially as described.

LEONARD PAGET.

Witnesses:
 C. J. KINTNER,
 J. F. QUINN.